(No Model.) 5 Sheets—Sheet 1.
P. G. & G. A. MUENCHINGER.
INCUBATOR.
No. 260,219. Patented June 27, 1882.
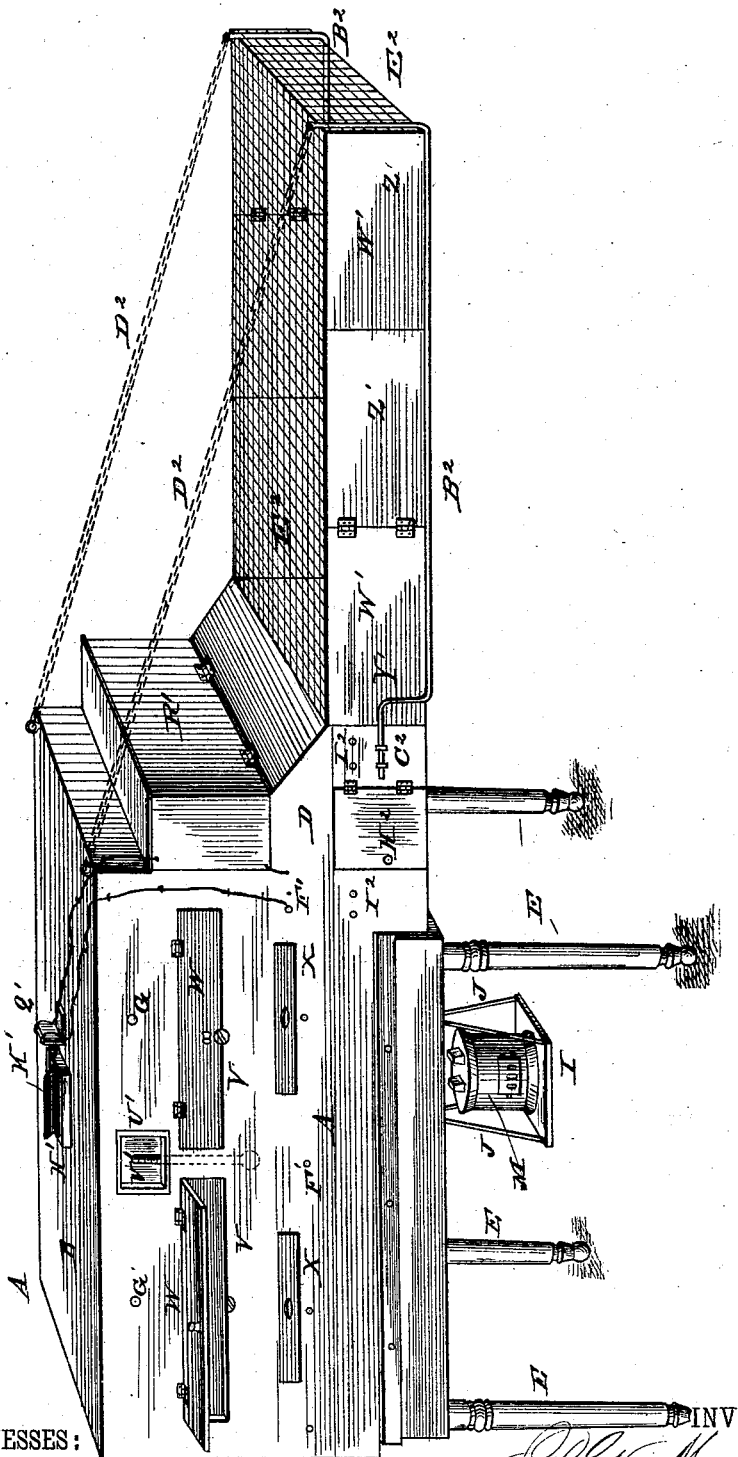

(No Model.) 5 Sheets—Sheet 2.
P. G. & G. A. MUENCHINGER.
INCUBATOR.
No. 260,219. Patented June 27, 1882.
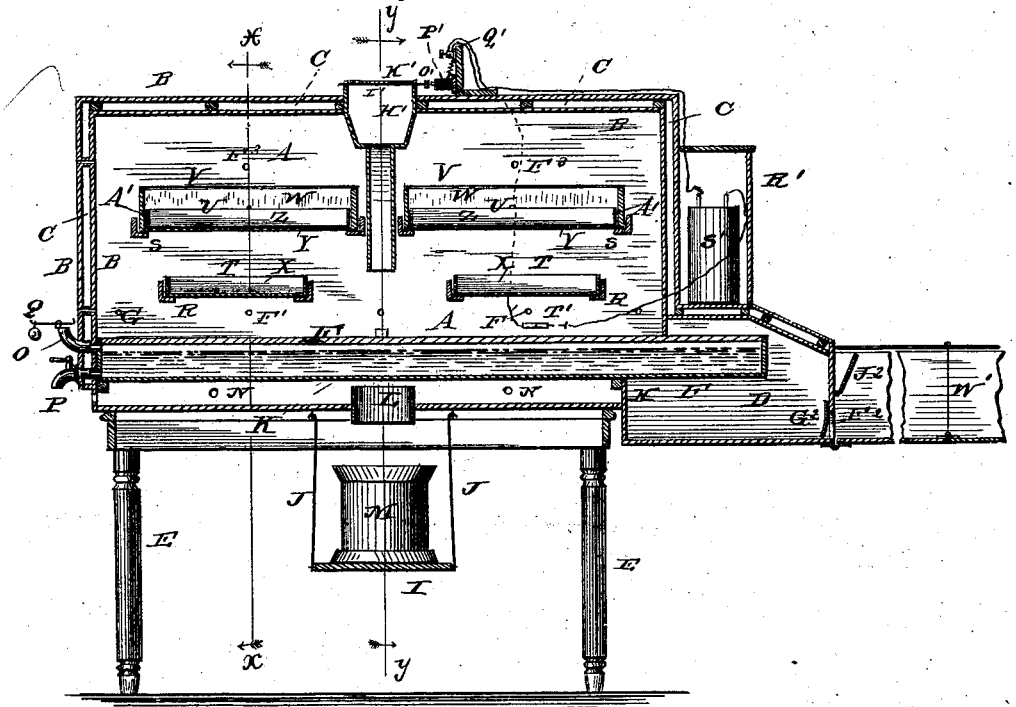
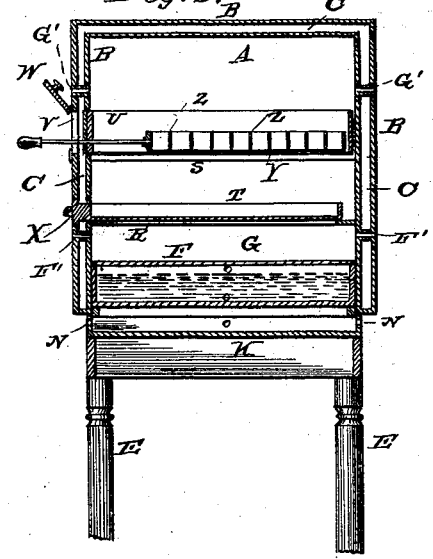
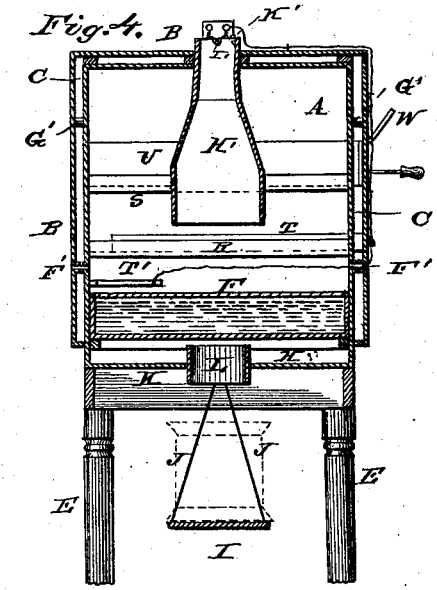
WITNESSES:
Fred. G. Dieterich
P. C. Dieterich
INVENTORS
Paul G. Muenchinger,
Gustav A. Muenchinger,
by A. Snow & Co.
ATTORNEYS.

(No Model.) 5 Sheets—Sheet 3.
P. G. & G. A. MUENCHINGER.
INCUBATOR.
No. 260,219. Patented June 27, 1882.

WITNESSES:

INVENTORS

ATTORNEYS.

(No Model.)  
5 Sheets—Sheet 4.

P. G. & G. A. MUENCHINGER.
INCUBATOR.

No. 260,219. Patented June 27, 1882.

WITNESSES:
Fred. G. Dieterich
P. C. Dieterich

INVENTORS
Paul G. Muenchinger
Gustav A. Muenchinger
by A. Snow & Co.
ATTORNEYS.

(No Model.)
P. G. & G. A. MUENCHINGER.
INCUBATOR.
No. 260,219. Patented June 27, 1882.
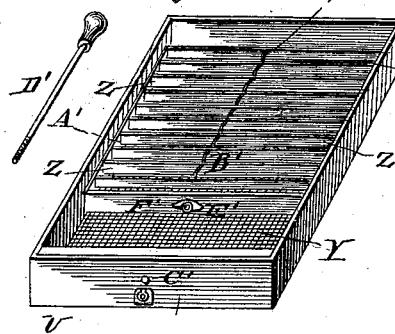
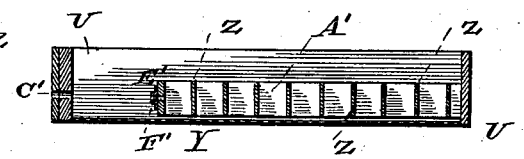
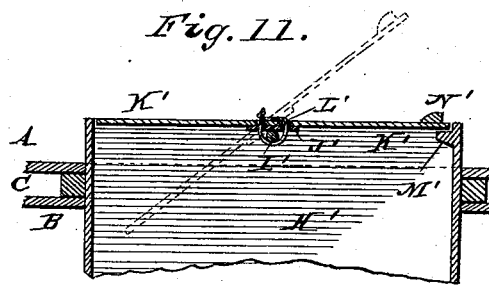
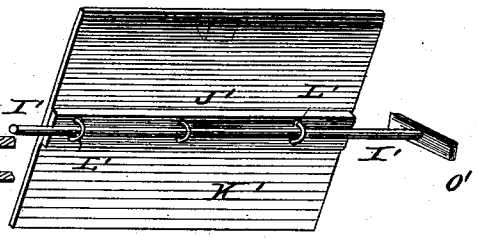
WITNESSES:
INVENTOR.
ATTORNEYS.

UNITED STATES PATENT OFFICE.

PAUL G. MUENCHINGER AND GUSTAVE A. MUENCHINGER, OF NEWPORT, RHODE ISLAND.

INCUBATOR.

SPECIFICATION forming part of Letters Patent No. 260,219, dated June 27, 1882.

Application filed March 17, 1882. (No model.)

*To all whom it may concern:*

Be it known that we, PAUL G. MUENCHINGER and GUSTAVE A. MUENCHINGER, of Newport, in the county of Newport and State of Rhode Island, have invented certain new and useful Improvements in Incubators; and we do hereby declare that the following is a full, clear, and exact description of the invention, which will enable others skilled in the art to which it appertains to make and use the same, reference being had to the accompanying drawings, which form a part of this specification.

Figure 5:
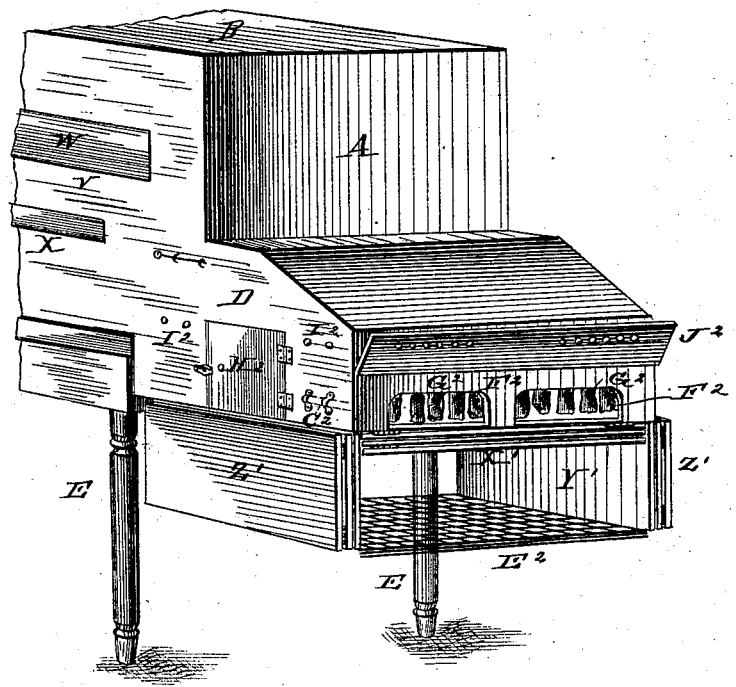
Figure 7:
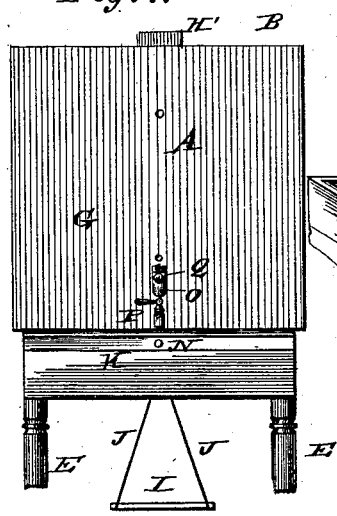
Figure 8:
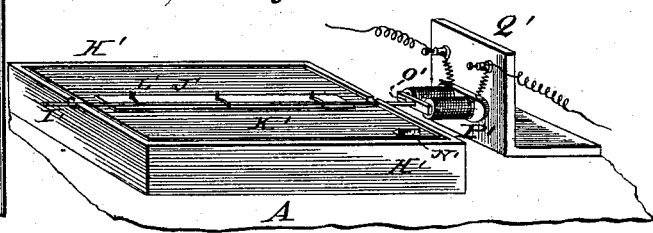
Figure 6:
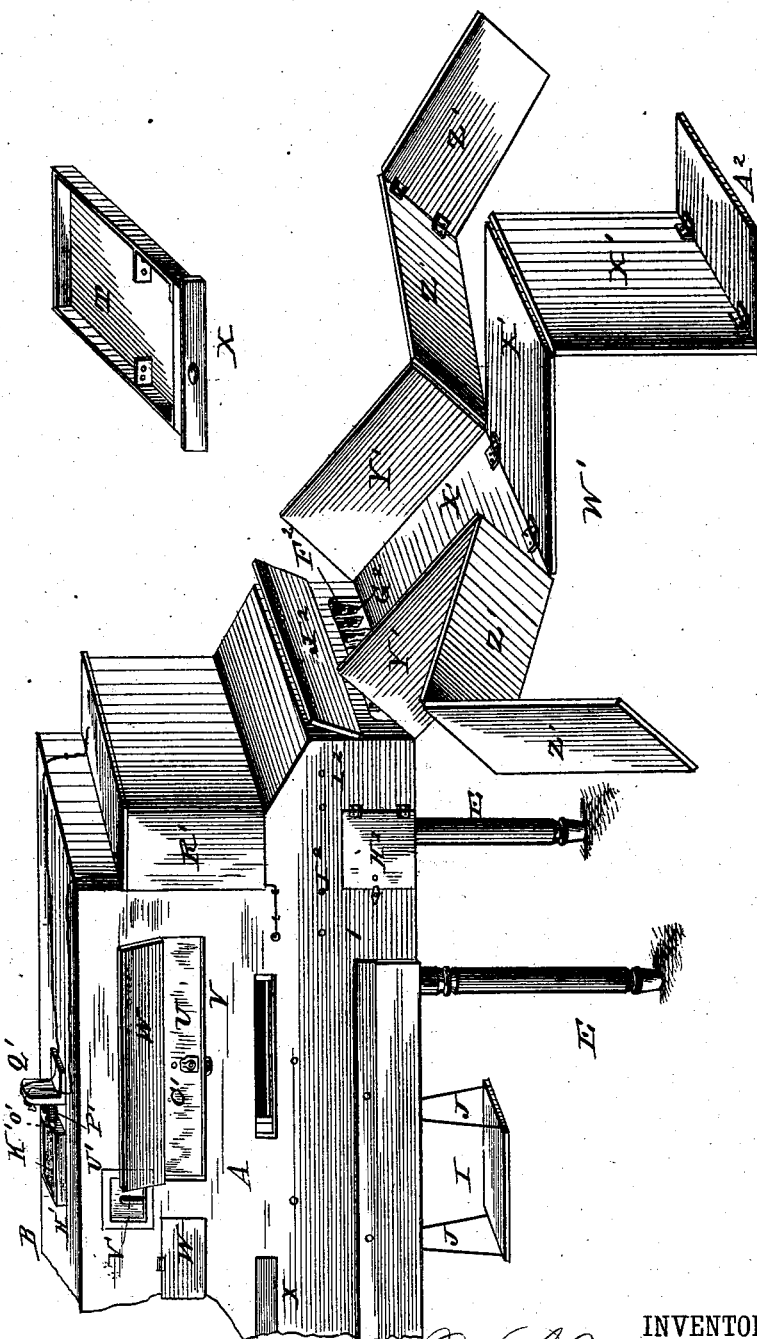

Figure 1 is a perspective view of our improved incubator. Fig. 2 is a longitudinal sectional view. Fig. 3 is a transverse vertical sectional view on the line $x\ x$, Fig. 2. Fig. 4 is a vertical sectional view on the line $y\ y$, Fig. 2. Fig. 5 is a perspective view, showing the incubator with the run folded to the position which it occupies when not in use. Fig. 6 is a perspective view, showing the construction of the run and illustrating how it folds. Fig. 7 is an end view of the incubator. Fig. 8 is a detail view, in perspective, of the ventilator. Fig. 9 is a detail view, in perspective, of the egg-drawer. Fig. 10 is a longitudinal sectional view of the same. Fig. 11 is a transverse vertical sectional view of the ventilator, and Fig. 12 is a detail view of the damper.

Corresponding parts in the several figures are denoted by like letters of reference.

This invention relates to incubators; and it has for its object to produce an apparatus which shall be convenient, portable, and inexpensive, and which shall hatch and furnish apartments in which the chickens may exercise and be fed and sheltered until old enough to take care of themselves, and which shall require but little attention, being provided with mechanism for automatically regulating the heat in a manner which is certain to operate at all times without getting out of order, all as will be hereinafter fully described, and particularly pointed out in the claims.

In the drawings hereto annexed, A represents the body of the incubator, which is a wooden box of suitable size and shape, having double sides and top B B, the space between which, C, is packed with sawdust or other non-conducting material, so that the interior of the box shall not be affected by the outside temperature. The box A is supported upon suitable legs, E E. The box A has at one end an extension forming a separate compartment, D, the bottom of which is lower than the bottom of the box proper. The chamber or compartment D, which will be hereinafter more fully described, constitutes the "artificial mother," in which the chickens are sheltered until old enough to take care of themselves.

F is a closed or covered tank, made preferably of galvanized iron, with a substantial copper bottom. Said tank is fitted in the box A, near the bottom of the same, and it must be closely fitted between the sides and the rear end, G, of the incubator-box, in order that no fumes or gases from the heating apparatus, which is arranged underneath said tank, shall escape into said box. At the front end the tank projects into the compartment D, which is also closely separated by partitions H from the body of the box A, in order to prevent fumes, gases, and impure air from entering said compartment.

A shelf, I, is suspended by hangers or brackets J under the bottom K of box A to support the heating apparatus. For this purpose we prefer to employ an oil-stove of some approved pattern, as it requires less attention and is less liable to get out of order than the lamps usually employed.

The bottom K is provided, just above the shelf I, with an opening, in which is fitted a short, wide, sheet-metal pipe, L, for the ingress of heat. The oil-stove, which is denoted by letter M, is located at such a distance under the bottom of the tank that the heat shall be distributed over the latter instead of striking it in a single place, as would be the case if the stove were placed too near. Openings N are formed in the sides of the box A for the escape of fumes and gases which may collect between the bottom of said box and the bottom of the tank.

The tank F is provided at its rear end with a filling-tube, O, and with a faucet, P, through which its contents may be drawn off, when desired. It is also provided with a damper or safety-valve, Q, for the escape of any excess of steam which may be generated.

Secured transversely in the body of the box

A, above the tank F, are two sets of cleats, R R, S S, the lower of which, R, support the evaporating-pans T and the upper ones, S, the egg-drawers U.

The side of the box or body A, as shown in Fig. 1, is provided with openings V, covered by hinged doors W, through which access may be had to the said egg-drawers.

The evaporating-pans are simply drawers or boxes made of galvanized sheet metal, with wooden front pieces, X. These pans are to contain water, which evaporates slowly, thus imparting the necessary humidity to the air in the incubator, making it unnecessary to sprinkle the eggs, which is now usually done in order to supply the necessary moisture.

The egg-drawers U, which are arranged upon the upper cleats, S, may be made of wood, with a bottom, Y, of fine wire-screening, so that the eggs shall be exposed evenly and completely to the surrounding heated atmosphere. The egg-trays are formed of strips Z of sheet metal, connected by side pieces, A', and by a central binding-wire, B'. The strips Z are to be a sufficient distance apart to enable the eggs to be placed between them, and the sides A' are to be fitted between the sides of the box forming the egg-drawer, in which the tray may slide longitudinally.

The front end of the egg-drawer has an opening, C', through which a small rod, D', screw-threaded at its end, may be inserted and attached to the front end of the tray, in which a small plate, E', having a screw-threaded opening, F', is countersunk, as shown. By means of this device the egg-tray may be slid or moved forward and back in the egg box or drawer, thus turning simultaneously all of the eggs in the drawer, upon the bottom of which the eggs will roll when pushed by the slide or egg-tray.

The sides of box A are provided, between the tank F and the evaporating-pans, and also above the egg-drawers, with openings, in which small tubes G' are fitted for the admission of pure air to the egg-space.

H' is the ventilator, which consists of a square or rectangular metallic frame, fitted in the top of the box A, and tapering downwardly, forming a funnel, which terminates in the egg-space of the incubator at a point below the egg-drawers. The lower portion of said funnel may be made of tin, but its upper portion must be of Russia iron or other stout rigid material.

Journaled in the upper end or frame of the ventilator is a shaft, I', which may consist of a stout brass wire, upon which a strip, J', of tin or other suitable material is soldered or otherwise secured. The damper K', which consists of a thick piece of isinglass of sufficient size to completely close the upper end of the ventilator, and yet turn freely therein, is secured to the strip J' by means of suitable staples or fastenings, L', of wire. To retain the damper in position when closed, one side of the ventilator-frame is provided with a stud or stop, M', and the damper is held automatically in a closed position by a small weight, N', secured to the side thereof, as shown.

Secured to the front end of the shaft I', and at an angle to the damper, is the armature O' of an electro-magnet, P', secured to a suitable bracket or stand, Q', projecting upward from the top of box A. The electro-magnet should be so located in relation to the armature that while the latter may be influenced thereby it shall not be able to touch or come in contact with the poles of the magnet. The box R', containing the cells of the battery S', is placed on top of the compartment D of the incubator, where it is out of the way and not liable to be upset and broken. The electrical circuit embraces the battery, the electro-magnet, and a thermostat, T', which is located in the box A at any point between the tank F and the egg-drawers. The thermostat is to be so adjusted as to make the circuit at the temperature (104° Fahrenheit) which requires to be maintained in the incubator, or whenever the heat exceeds this point, and break it when it grows less. The object of this will be easily understood. When the heat exceeds the required degree the circuit is made and the temporary magnet attracts the armature, thus opening the damper and permitting the superfluous heat to escape through the ventilator, where a draft is created from the openings F' in the sides of the incubator. When the temperature in the latter falls below the stated degree the circuit is broken and the damper automatically closes.

A window, U', through which the interior of the incubator may be observed, is placed in the side of the box A, near the top, and a thermometer, V', placed inside the window, with its bulb projecting just below the egg-drawers, indicates at all times the temperature to which the eggs are exposed.

To the front end of the chamber or compartment D of the box A is hinged the folding "run" W', the construction of which will be clearly understood by reference to Fig. 6 of the drawings. It consists of the bottom leaves, X', hinged together and to the incubator-box, the inner side leaves, Y', secured to the inner bottom leaves, the outer side leaves, Z' Z', hinged together and to the outer edges of the inner side leaves, and the end leaf, A², hinged to the edge of the outer bottom leaf. The several leaves may be provided with suitably-arranged hooks, for the purpose of retaining them in position when either folded or extended. When extended the run is to be supported upon iron rods or brackets B², secured detachably in staples C² upon the sides of the incubator. It is furthermore to be supported by means of chains D², secured to the upper front corners of the box A and to the end section of the run.

A top or covering, E², for the run is constructed of wire screening, which is made in sections, so as to be capable of being folded, as shown in Fig. 5 of the drawings.

The chamber or compartment D has openings F², communicating with the run. These openings, through which the chickens may pass into the run and back, are overhung with curtains G², so arranged that the chickens may pass through without danger of being held fast. The curtains serve to prevent heat from escaping from the compartment D, which is heated by the end of tank F, projecting into its upper part, as shown, so that the chickens may occupy the floor of the compartment D without coming in contact with the heated tank.

Access to the chamber D may be had through a door, H², placed in the side of the box, and it is kept well ventilated and supplied with fresh and pure air through small openings I² in the sides of the box.

The chamber D may be closed and separated from the run when it is desired to exclude the chickens from the latter or from the said chamber by a folding door, J², hinged over the openings F².

The operation and advantages of our improved incubator will be readily understood from the foregoing description, taken in connection with the drawings hereto annexed. It is simple in construction, and requires but little attention. The heat-regulating mechanism is exceedingly simple and certain in its operation, having no complicated arrangement of levers, clock-works, &c., which are always liable to get out of order, thus causing much annoyance and loss of time, besides interfering with the progress of the incubation. The entire device is readily portable, and when the run is folded occupies but little space.

Having thus described our invention, we claim and desire to secure by Letters Patent of the United States—

1. In an incubator, the combination, with the body or box A, having extension or chamber D, the bottom of which is lower than the bottom of said box, of the tank F, fitted closely between the sides and ends of said box a short distance above the bottom and extending into the chamber D, as set forth.

2. In an incubator, the combination, with the box A, having extension D, forming a separate chamber or compartment, of the run composed of the hinged and folding parts X' Y' Z' A², substantially as set forth.

3. The combination, with the incubator having the herein-described folding run and staples C², of the detachable rods or brackets B² and chains D², as set forth.

4. The incubator having compartment D, with openings F², folding door J², and curtains G², in combination with the herein-described folding and extensible run, as and for the purpose herein set forth.

5. The combination, with the incubator having chamber or compartment D, provided with openings F², curtains G², and door J², and heating-tank F, extending from the incubator into said chamber D, of the folding and extensible run, as herein shown and specified.

In testimony that we claim the foregoing as our own we have hereunto affixed our signatures in presence of two witnesses.

PAUL G. MUENCHINGER.
GUSTAVE A. MUENCHINGER.

Witnesses:
HERBERT BLISS,
WM. G. WARD, Jr.